United States Patent [19]

Danko

[11] Patent Number: 4,911,412

[45] Date of Patent: Mar. 27, 1990

[54] VALVES WITH IMPROVED ACTUATORS

[75] Inventor: Oliver L. Danko, Chesterland, Ohio

[73] Assignee: Nupro Company, Willoughby, Ohio

[21] Appl. No.: 354,616

[22] Filed: May 19, 1989

[51] Int. Cl.⁴ ............................................. F16K 31/00
[52] U.S. Cl. .................................. 251/335.3; 251/264
[58] Field of Search .................. 251/264, 335.1, 335.2, 251/335.3

[56] References Cited

U.S. PATENT DOCUMENTS

| | | | |
|---|---|---|---|
| 1,374,571 | 4/1921 | Hummel | 251/335.3 |
| 1,696,070 | 12/1928 | Wood | 251/335.3 |
| 1,890,248 | 12/1932 | Edwards | 251/264 |
| 1,892,344 | 12/1932 | Huber | 251/264 |
| 1,906,313 | 5/1933 | Clifford | 251/264 |
| 3,278,156 | 10/1966 | Callahan, Jr. et al. | 251/335.3 |
| 3,491,789 | 1/1970 | Callahan, Jr. et al. | 137/340 |
| 3,787,023 | 1/1974 | Shufflebarger et al. | 251/335.3 |
| 4,166,607 | 9/1979 | Webb | 251/335.3 |
| 4,513,779 | 4/1985 | Owoc et al. | 137/556 |

FOREIGN PATENT DOCUMENTS

| | | | |
|---|---|---|---|
| 1234306 | 5/1960 | France | 251/335.3 |
| 596046 | 7/1959 | Italy | 251/335.3 |
| 1315707 | 6/1987 | U.S.S.R. | 251/335.3 |
| 683387 | 12/1952 | United Kingdom | 251/264 |
| 1417343 | 5/1973 | United Kingdom | 251/335.3 |

Primary Examiner—A. Michael Chambers
Attorney, Agent, or Firm—Fay, Sharpe, Beall, Fagan, Minnich & McKee

[57] ABSTRACT

A bellows valve comprises a main body defining a valve chamber including a valve seat having inlet and an outlet passages connected therewith. A vlave element is positioned in the chamber and has an operating stem with a free end extending axially therefrom. An actuating assembly for moving the valve element toward and away from the seat, includes a rotatably mounted actuating shaft having a free end axially aligned with the free end of the operating stem and an operator for selectively producing axial movement of the actuating shaft. The operating stem is joined to the actuating shaft by a connection including a first ball member positioned axially between the free ends of the operating stem and the actuating shaft with a spring engaged with the first ball member and acting to bias the free ends of the operating stem and actuating shaft axially apart. A plurality of second ball members interconnect the stem and shaft for preventing axial separation of the free ends while permitting free relative rotation.

12 Claims, 2 Drawing Sheets

VALVES WITH IMPROVED ACTUATORS

BACKGROUND OF THE INVENTION

The subject invention is directed toward the valve art and, more particularly, to valves having improved operators. The invention is particularly suited for use in bellows type valves and will be described with particular reference thereto; however, as will be appreciated, the invention is capable of broader application and could be incorporated in many different types of valves.

Corrugated bellows members formed from metal provide a highly efficient method of sealing valve chambers. Bellows sealed valves are well known and widely used when hermetically sealing and/or the elimination of mechanical seals is desired.

Typically, the metal bellows members used for valve sealing have a long life. Generally they are capable of undergoing a very large number of operating cycles so long as they are subjected to only axial extension and contraction and are not also subjected to torque.

When bellows sealed valves are actuated through the use of air cylinders or similar linear motion devices, torque problems are not present. However, when using rotary actuators such as a rotary threaded operating stem, torque transmission to the bellows becomes a problem. Similarly, problems can be encountered with other actuators such as certain toggle and lever actuators.

Many different solutions have been proposed for eliminating the various problems discussed above. For example, a variety of pinned, non-torque transmissive joints have been used. These are illustrated, for example, in U.S. Pat. Nos. 1,906,313, 3,278,156 and 3,491,789. Generally, however, these prior arrangements transmit some torque and typically have an undesirable amount of backlash.

BRIEF STATEMENT OF THE INVENTION

The subject invention overcomes the problems discussed above and provides a valve and actuating assembly which eliminates torque transmission between a rotary actuator and the valve element while also eliminating backlash.

In accordance with the subject invention, a valve is provided which comprises a main body that defines a valve chamber having an inlet and an outlet with a valve seat located therebetween. Positioned in the valve chamber is a valve element having an operating stem with a free end extending therefrom. Actuating means are provided for moving the valve element toward and away from the seat. The actuating means include a rotatably mounted actuating shaft having a free end facing and axially aligned with the free end of the operating stem. Means are provided for selectively producing axial movement of the actuating shaft. In addition, connecting means are provided for joining the operating stem to the actuating shaft. The connecting means includes a first ball member positioned axially between the free ends of the operating stem and the actuating shaft. A spring means is engaged with the first ball member and acts to bias the free ends of the operating stem and actuating shaft axially apart. In addition, second ball means are provided for preventing axial separation of the free ends while permitting free relative rotation.

Preferably, and in accordance with a more limited aspect of the invention, the second ball means includes a plurality of second ball members which are located between the operating stem and the actuating shaft at a location radially outwardly of the first ball member.

It is preferable that the second ball members be carried in openings formed about one or the other of the actuating shaft and operating stem and that they engage in a circumferentially extending groove formed in the other of the operating stem and actuating stem shaft. It is further desirable to the second ball members equally spaced circumferentially of the axis of the first ball member at a location radially spaced therefrom.

The combination of the first ball member and its associated compression spring acts to permit axial force to be transmitted between the actuating shaft and the operating stem. The second ball members and their interconnection between the operating stem and the actuating shaft allows tension forces to be carried by the connection between the operating stem and the actuating shaft. The overall combination of the elements does, however, eliminate the transmission of torque between the rotatable actuating shaft and the axially driven operating stem.

The means for moving the actuating shaft can be of a variety of types. For example, the actuating shaft can be a simple rotary actuator with external threads for producing the desired axial movement. Alternatively, various types of toggle and lever arrangements can be used to produce axial movement with a lesser component of rotary movement.

Accordingly, a primary object of the subject invention is the provision of a valve actuating system which is particularly useful in bellows type valves for eliminating backlash and torque transmission between a rotary actuating shaft and a linearly movable operating stem.

Still further object is the provision of a connecting and force transmission system for use in valve operators wherein all of the axial forces are transmitted through rotary mounted ball members which are maintained under a bias to eliminate backlash.

A still further object is the provision of a system of the type described which is relatively simple and highly reliable.

BRIEF DESCRIPTION OF THE DRAWINGS

The above and other objects and advantages will become apparent from the following description when read in conjunction with the accompanying drawings wherein:

Referring more particularly to the drawings wherein the showings are for the purpose of illustrating preferred embodiments of the invention only, and not for the purpose of limiting same, FIG. 1 illustrates a bellows type valve 10 incorporating a body and valve housing assembly 12 carrying a rotary type manual actuator assembly 14. The valve body and housing assembly 12 could have a variety of constructions and arrangements but, in the subject embodiment, is the same as shown in commonly assigned U.S. Pat. 4,687,017 which is incorporated herein by reference. As more particularly shown and described in the prior patent, the body and housing assembly 12 comprises a main body member 16 having a generally cylindrical valve chamber 18 and suitable inlet and outlet passages 20, 22. Mounted axially within the valve chamber 18 is a valve element 24 having a generally cylindrical shape and carrying a replaceable valve tip member 26 arranged to cooperate with seat member 28. Movement of the valve element 24 is accomplished through a stem portion 30 which extends axially from the valve chamber 18. Movement of the stem 30 is guided by a suitable sleeve bearing 32 carried in a gland member 34.

Figure 1:
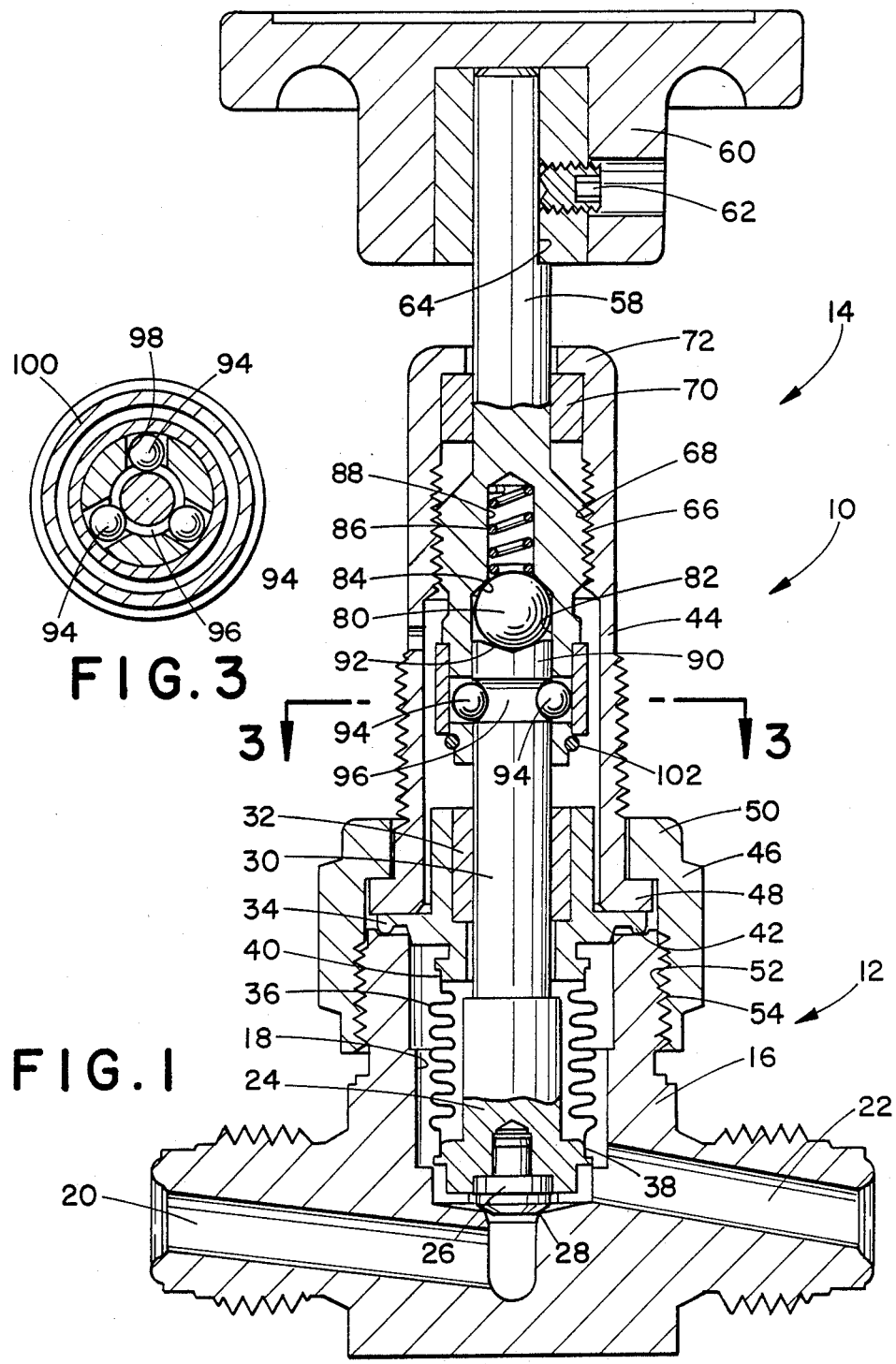
FIG. 1 is a vertical cross-sectional view through a bellows type valve incorporating a manually actuated rotary operator.

In the subject embodiment, sealing of the valve chamber is accomplished by a metal bellows member 36 which has its lower end suitably joined at 38 to the inner end of the valve element 24. Preferably the joining is accomplished through a suitable weld. The upper end of the bellows is likewise welded or otherwise positively joined at 40 to the inner end of the sealing gland 34. A seal between the gland 34 and the upper end of body 16 is provided by a bead 42 which engages a suitable sealing surface formed circumferentially about the upper end of the valve chamber 18. The gland member 34 is clamped into sealing position and held in proper alignment with the valve chamber by a bonnet member 44 and a bonnet nut 46. As illustrated, cooperating flanges 48, 50 are formed on the bonnet 44 and the bonnet nut 46 respectively. Threads 52 are formed internally of the nut 46 and are engaged with external threads 54 formed about the upper end of the body 16.

In the embodiment under consideration, axial movement of the valve member 24 to move the valve tip 26 into and out of engagement with the seat 28 is accomplished through a manual actuator 14 which comprises an actuating stem assembly 58 terminating in an outer free end to which is connected an operating handle 60. The operating handle 60 is in the subject embodiment, releasably connected through the use of a set screw 62 which engages with a suitable flat 64 formed on the upper end of the actuating shaft 58.

Rotary movement of the handle 60 is converted to axial movement through cooperating threads 66 and 68 formed about the enlarged lower exterior of the stem 58 and the interior of the bonnet 44 respectively. A seal and guide ring 70 is carried in the upper end of the bonnet and retained therein by a inwardly extending flange 72. The guide and seal ring 70 serves to contain a suitable lubricant sealed within the bonnet to maintain the cooperating treads 66, 68 properly lubricated.

As previously discussed, metal bellows, such as the bellows member 36, are capable of undergoing axial flexure for an extremely high number of cycles without failure so long as they are not subjected to twisting or torque forces. As a consequence, to properly utilize such bellows in a valve of the type under consideration, means must be provided to allow the axial movement of the actuating shaft 58 to be transferred to the operating stem 30 without conducting torque thereto. In particular, the connection used in the subject valve comprises a first rigid ball member 80 which is carried within an inwardly extending and axially aligned cylindrical opening 82 formed in the enlarged lower end of the actuating shaft 58. The ball member 80 is arranged to engage against the conical surface 84 formed at the inner end of the opening 82. In order to overcome backlash and, for reasons subsequently to be discussed, a relatively heavy coil spring member 86 is carried within a small diameter bore 88 formed inwardly of ball 80. The spring 86 maintains a continual axial bias against the ball member 80 acting to move it in a direction toward the upper end 90 of the operating stem 30.

As illustrated, the upper end 90 of the operating stem 30 is sized so as to be closely received within the inwardly extending cylindrical bore 82. The end of stem 30 includes a somewhat conical depression 92 which is engaged with the ball 80. The action of spring 86 maintains the ball in contact with the conical depression 92 and allows axial forces to be transmitted between the actuating shaft 58 and the operating stem 30. A positive axial connection between the operating stem 30 and the actuating shaft 58 is maintained by a group of second ball members 94 which are positioned axially outwardly of the axis of ball member 80 as illustrated in FIG. 3. In particular, there are preferably three of the ball members 94 positioned at locations equally spaced circumferentially of operating stem 30. As shown, the balls engage in a continuous groove 96 formed circumferentially about the upper end of stem 30. They are maintained in the groove by being received through openings 98 formed through the wall of the inner end of operating stem 58. A circumferentially extending sleeve 100 is closely received on the end of actuating shaft 58 and is retained in position by a circumferentially extending snap ring or the like 102. As can be appreciated, the arrangement of the ball members 94 assures that there is a direct and positive connection between actuating shaft 58 and operating stem 30 for conducting forces and producing simultaneous axial movement between the actuating shaft 58 and the operating stem 30. However, the arrangement is clearly such that free relative rotational movement can take place between the two components and no torque or rotary movement will be conducted therebetween. In addition, the arrangement of the compression spring 86 assures that backlash or lost motion will be maintained at a minimum during reversing movement of the actuating shaft 58.

Figure 2:
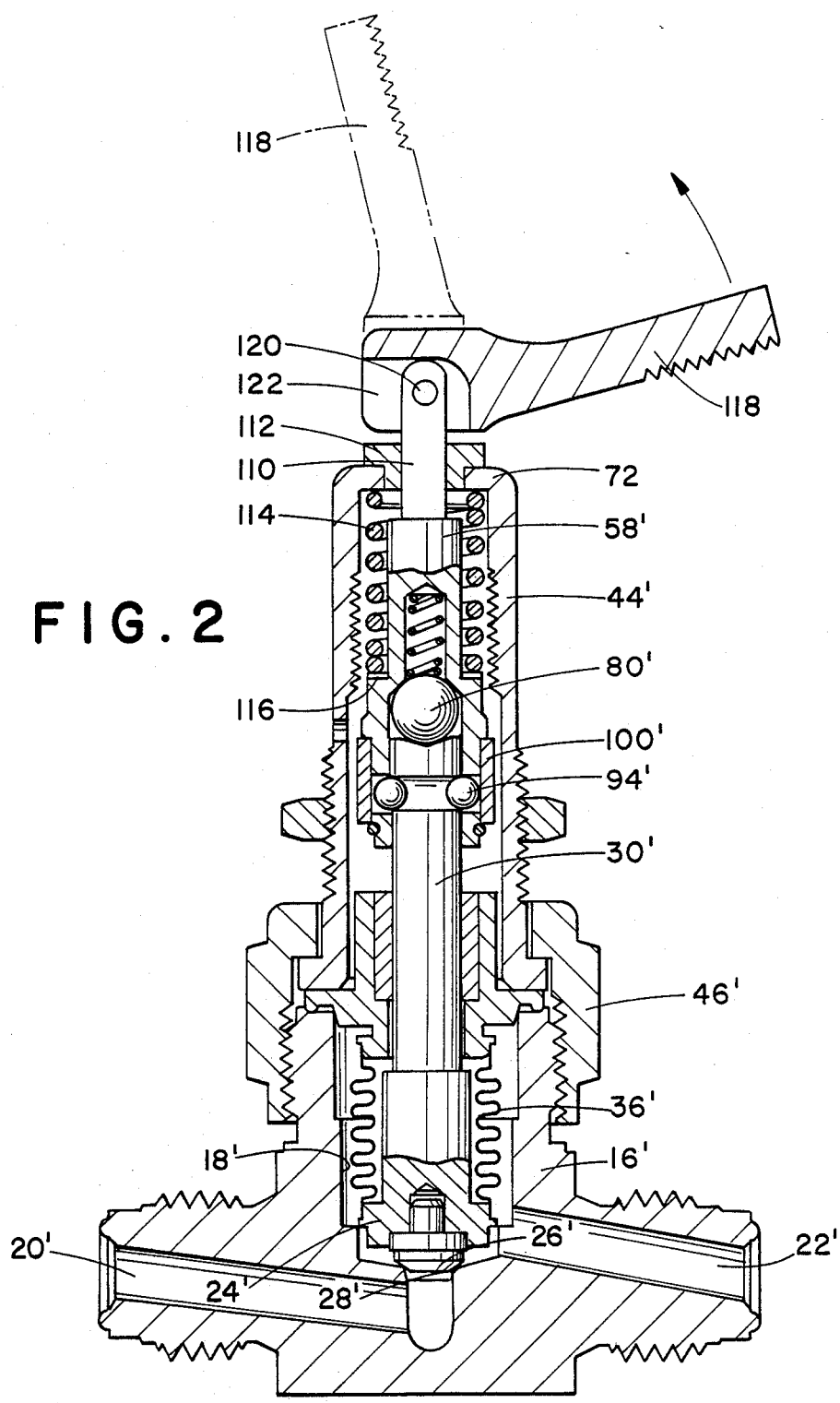
FIG. 2 is a view similar to FIG. 1 but illustrating a toggle type operator; and, FIG. 3 is a view taken on line 3—3 of FIG. 1.

FIG. 2 illustrates the invention as applied to a toggle type valve actuator. In the FIG. 2, embodiment like reference numerals differentiated by a prime suffix have been used to illustrate the same or corresponding parts as those previously discussed with reference to the FIG. 1 embodiment. New or modified elements are identified with new numerals.

In the FIG. 2 embodiment the actuating shaft 58' has a reduced diameter upper end portion 110 which extend through a suitable guide element 112 carried in the upper end of bonnet 44'. In this embodiment, the actuating shaft 58' is maintained under a continuous downward bias by a relatively heavy compression spring 114 received about the exterior of the actuating shaft 58'. The lower end of spring 114 engages against a shoulder 116 formed on actuating shaft 58'. The upper end of the spring 114 engages as shown against the inwardly extending flange 72 on the upper end of bonnet 44'. This continually biases the valve element 24' and the valve tip 26' toward a closed position relative to the valve seat 28'.

In this embodiment, the means for moving the valve stem 30' in a direction to move the valve 24' away from the seat 28' comprises a toggle handle 118 which is suitably connected to the upper end of portion 110 of actuating shaft 58' by a transversely extending pivot pin 120. The toggle member 118 includes a camming surface 122 which is arranged to engage the upper surface of guide 112 when handle or toggle 118 is pivoted to the dotted line position. The camming surface 122 is, of course, arranged to cause the actuating shaft 58' to be pulled upwardly. The arrangement thus far described allows the actuating toggle or handle 118 to serve to move the valve to an open position but, also, the toggle can be pivoted to extend in substantially any direction relative to the valve 10. Such pivoting movement is permitted and no torque is transmitted to the sealing bellows 36' because of the arrangement of the previously discussed balls 80' and ball members 94'.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

What is claimed is:

1. A valve comprising:
   a main body defining a valve chamber having inlet and an outlet passages connected therewith; a valve seat located in said chamber between said inlet and outlet passages;
   a valve element positioned in said chamber having an operating stem with a free end extending axially therefrom; and,
   actuating means for moving said valve element toward and away from said seat, said actuating means including a rotatably mounted actuating shaft having a free end facing and axially aligned with the free end of said operating stem; means for selectively producing axial movement of said actuating shaft; connecting means for joining said operating stem to said actuating shaft, said connecting means including a first ball member positioned axially between the free ends of said operating stem and said actuating shaft, spring means engaged with said first ball member and acting to bias said free ends of said operating stem and actuating shaft axially apart, and second ball means for preventing axial separation of said free ends while permitting free relative rotation.

2. The valve as defined in claim 1 wherein said second ball means includes a plurality of second ball members located between said operating stem and said actuating shaft.

3. The valve as defined in claim 2 wherein said plurality of second ball members are located radially outwardly of said first ball member.

4. The valve as defined in claim 2 wherein said plurality second ball members are engaged in cooperating grooves and openings carried by said operating stem and said actuating shaft.

5. The valve as defined in claim 1 wherein said means for producing axial movement of said actuating shaft includes a pivotal toggle lever drivingly connected to said actuating shaft.

6. The valve as defined in claim 1 wherein said means for producing axial movement of said operating shaft includes threads carried by said operating shaft.

7. The valve as defined in claim 1 wherein one of said actuating shaft and said operating stem carries a socket portion which receives the free end of the other.

8. The valve as defined in claim 7 wherein said ball means comprise a plurality of second ball members carried in openings in said socket portion.

9. A valve comprising:
   a valve body defining a valve chamber having inlet and outlet flow passages connected through a valve seat;
   a valve element carried on an operating stem in said valve chamber for movement toward and away from said seat; an actuating shaft carried by said body and having a free end axially aligned with a free end of said operating stem; and, connecting means for joining said actuating shaft to said operating stem for permitting transfer of axial forces therebetween while preventing transfer of torque, said connecting means including a first ball member positioned between and axially aligned with said free ends of said actuating shaft and said operating stem, a spring means acting against said first ball member to apply a biasing force acting to bias said operating stem and said actuating shaft in axially opposite directions, and retaining means for preventing axial separation of said operating stem and said actuating shaft while allowing free relative rotation therebetween.

10. The valve as defined in claim 9 wherein said retaining means includes a plurality of second ball members spaced axially and radially of the first ball member.

11. The valve as defined in claim 10 wherein said second ball members engage in a circumferential groove carried on one of said operating stem and said actuating shaft.

12. The valve as defined in claim 11 wherein said second ball members are positioned circumferentially about said operating stem and are retained in said circumferential groove by a sleeve member.

* * * * *